(12) United States Patent
Guzik et al.

(10) Patent No.: US 7,467,479 B2
(45) Date of Patent: Dec. 23, 2008

(54) HEADSTACK LOCATOR ASSEMBLY FOR TESTING MAGNETIC HEADS

(75) Inventors: Nahum Guzik, Palo Alto, CA (US); Charles Brice Arnold, Newark, CA (US); Vladimir M. Chevlioukevitch, Santa Clara, CA (US)

(73) Assignee: Guzik Technical Enterprises, Mountain View, CA (US)

( * ) Notice: Subject to any disclaimer, the term of this patent is extended or adjusted under 35 U.S.C. 154(b) by 0 days.

(21) Appl. No.: 11/349,508

(22) Filed: Feb. 7, 2006

(65) Prior Publication Data

US 2007/0017109 A1    Jan. 25, 2007

(51) Int. Cl.
*G01D 21/00* (2006.01)
(52) U.S. Cl. .......................................... 33/613; 33/645
(58) Field of Classification Search .................... 33/613, 33/623, 644–645; 324/212, 210
See application file for complete search history.

(56) References Cited

U.S. PATENT DOCUMENTS

| | | | | |
|---|---|---|---|---|
| 5,872,451 | A * | 2/1999 | Guzik | 324/212 |
| 7,129,702 | B2 * | 10/2006 | Mori et al. | 324/212 |
| 7,141,969 | B2 * | 11/2006 | Guzik | 324/261 |
| 2007/0018640 | A1 * | 1/2007 | Guzik et al. | 324/212 |

* cited by examiner

*Primary Examiner*—Yaritza Guadalupe-McCall
(74) *Attorney, Agent, or Firm*—Foley & Lardner LLP; Joseph M. Maraia; Matthew Fenselau

(57) ABSTRACT

A headstack locator assembly for locating and fixing a headstack on a spinstand and which mitigates the aforementioned prior art limitations. The headstack locator assembly includes a headstack locator received on a fixed locator. The headstack locator connects to a headstack, while the fixed locator is permanently secured to a spinstand. A vacuum is used to clamp the headstack locator to the fixed locator for testing of the headstack. Upon test completion, the headstack locator is released from the fixed locator by applying positive air pressure to the assembly.

11 Claims, 14 Drawing Sheets

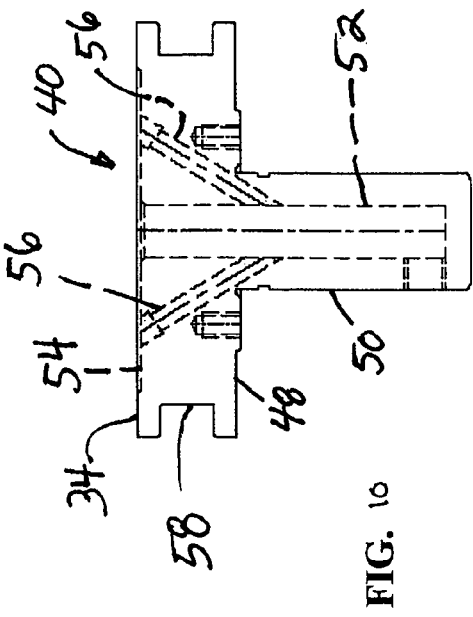
FIG. 10
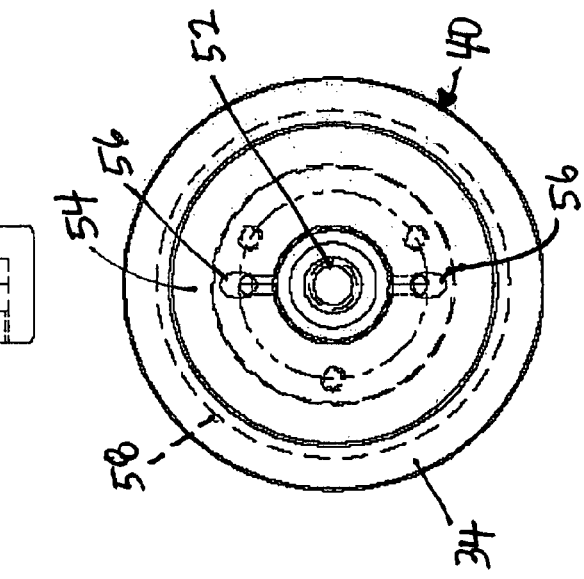
FIG. 11
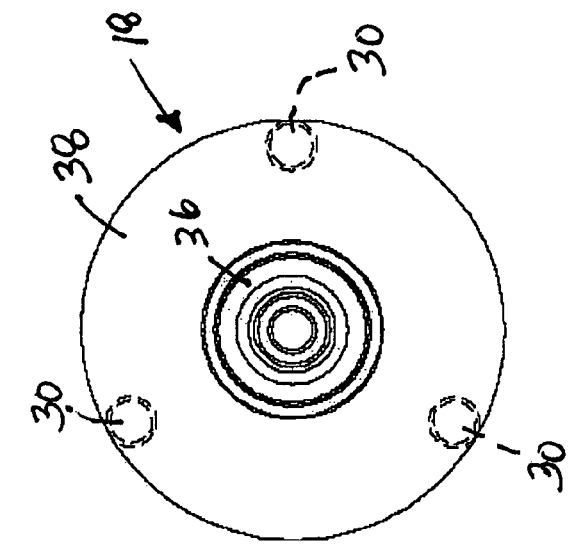
FIG. 8
FIG. 9

HEADSTACK LOCATOR ASSEMBLY FOR TESTING MAGNETIC HEADS

FIELD OF THE DISCLOSURE

The present disclosure relates to testing of components of hard drives for computers, and, specifically, it deals with a system for locating and fixing a headstack, which is a part of a hard disk assembly, in a headstack tester.

BACKGROUND OF THE DISCLOSURE

Modern computers have hard drives that are made in the form of a headstack and a stack of hard disks. A headstack is an assembly that includes one or more read and write heads, which are stacked in such a manner as to work in conjunction with the pack of hard disks, which are used for data storage. These devices are well known and are used in many data storage applications. The headstacks are manufactured by many companies such as SAE Magnetics, Western Digital (Read-Rite), Hitachi Global Storage Technologies (IBM), Seagate, and others. The headstack is generally mounted on a shaft by means of bearings, which allows the headstack to rotate freely on the shaft. During data storage operations (reading and writing), the magnetic heads are turned on the shaft to position them with respect to the hard disks.

A magnetic head and disk tester is an instrument that is used for testing the characteristics of magnetic heads and disks, such as a signal-to-noise ratio, track profile, etc. The tester simulates those motions of the head with respect to the disk and the same rotational speeds of the disks that occur in an actual hard disk drive during operation. Each tester consists of two components, i.e., a mechanical component, commonly referred to as a spinstand, that performs movements of the head with respect to the disk, and an electronic component that is responsible for measurement, calculation, and analysis of the measured signal. The spinstand is also a mechanical component of a servo-writer, an instrument that is used for writing servo information on a magnetic disk, as well as a component of a flying height tester; an instrument used for measuring the flying height of a head over the disk.

An example of a prior art spinstand for a head and disk tester is illustrated in FIGS. 1 and 2. The spinstand 100 includes a stationary base plate 110 that supports walls 112a, 112b, 112c. The walls 112a, 112b, 112c in turn support a spindle 113 for carrying a disk pack DP disposed in a cylindrical disk pack region including one or more magnetic disks 114, having diameter D, and being coaxial about a disk pack axis DPA. The spindle 113 and the disks 114 are rotated by a spindle motor 115 about a spin axis SA.

The base plate 110 further supports first and second slide motors (not shown). The first slide motor moves a slide 116 along rails 117a, 117b in the Y direction (see FIG. 2). Two additional rails, 118a, 118b, are mounted on top of slide 116. The second slide motor controls movement of a second slide 119 along rails 118a, 118b in the X direction. The first and second motors cooperate to position a headstack 120 mounted on a headstack locator 121 of the slide 119 to a specified location with respect to the center of spindle 113. The headstack 120 carries and positions magnetic head(s) 122 relative to disk(s) 114.

Other examples of prior art spinstands for a head and disk tester include the Guzik V2002 XY-positioning spinstand and the Guzik S-1701 Series Micro Positioning Spinstand, all of which are available from the assignee of the present disclosure, Guzik Technical Enterprises, 2443 Wyandotte Street, Mountain View, Calif. 94043, USA (www.guzik.com).

As the density of magnetic recording increases, additional information tracks are compressed into a given disk area. The decrease in track size heightens the demand for improved accuracy in head positioning. Likewise, the rotational speeds of the magnetic disks increase in order to achieve shorter access times. In addition, more disks are added to the disk stack to provide additional storage.

As the disk(s) rotate, vibrations in both the disks and the magnetic heads may be induced. These vibrations increase track misregistration. In some cases, track misregistration between the disks and the magnetic heads reaches unacceptable levels at which spinstand operation becomes unreliable.

What is still desired is a new and improved apparatus and method for locating and fixing a headstack on a spinstand. Among other aspects and advantages, the new and improved apparatus and method will quickly and accurately locate and secure a headstack to a spinstand for testing, while retaining the reliability and stability of all previous methods.

SUMMARY OF THE DISCLOSURE

The present disclosure is directed to a new and improved headstack locator assembly for locating and fixing a headstack on a spinstand and which mitigates the aforementioned prior art limitations. According to one exemplary embodiment of the present disclosure, the new and improved headstack locator assembly includes a headstack locator received on a fixed locator. The headstack locator connects to a headstack, while the fixed locator is permanently secured to a spinstand. A vacuum is used to clamp the headstack locator to the fixed locator for testing of the headstack. Upon test completion, the headstack locator is released from the fixed locator by applying positive air pressure to the assembly.

In one form, the fixed locator includes a fixed locator bushing and a pin receiving aperture. The fixed locator bushing is disposed about and extends transverse to the fixed locator axis. The fixed locator bushing has an upper surface extending transverse to the fixed locator axis.

The pin receiving aperture extends from the fixed locator bushing along the fixed locator axis. The pin receiving aperture has a contour with a circular cross-section having a radius which monotonically decreases from the upper surface of the fixed locator bushing.

The pin receiving aperture extends from a region adjacent to the upper surface of the fixed locator bushing to a port. The port is adapted to receive an applied vacuum and an applied positive pressure.

The headstack locator extends along a headstack locator axis and includes a headstack locator and a locating pin. The headstack locator bushing has an upper surface and a lower surface and is disposed about and extends transverse to the headstack locator axis. The headstack locating bushing has a lower surface extending transverse to the headstack locating axis. The headstack locating bushing has on its upper surface, a coupling assembly for receiving a headstack having a headstack axis, whereby the headstack axis is coaxial with the headstack locator axis.

The locating pin extends from the lower surface of the headstack locator bushing along the headstack locator axis. The locating pin has an outer contour with a circular cross-section having a radius which decreases monotonically from the lower surface. The contour of the locating pin is substantially complimentary to the contour of the pin receiving aperture.

The headstack mounting assembly further includes a sleeve extending along a sleeve axis. The sleeve extends from a peripheral surface of the fixed locator bushing. In alternative embodiments, the sleeve extends from a peripheral surface the headstack locator bushing. In those embodiments, the sleeve axis is coaxial with a corresponding one of the fixed locator axis and the headstack locator axis and the other of the fixed locator bushing and the headstack locator bushing is positionable within the sleeve with the fixed locator axis, the headstack locator axis and the sleeve axis being coaxial when the pin is disposed within the pin receiving aperture.

In a preferred form of the invention, the headstack mounting assembly further includes a seal disposed on one of a peripheral surface of the fixed locator bushing and a peripheral surface of the headstack locator bushing. The seal pneumatically isolates a region between the upper surface of the fixed locator bushing and the lower surface of the headstack locator bushing and within the sleeve. The seal pneumatically couples the region to regions outside the headstack mounting assembly when a positive pressure is applied to the port.

In use, when the pin is disposed within the pin receiving aperture and a vacuum is applied to the port, the static pressure in the region, responsive to the applied vacuum and ambient pressure outside the assembly, biases the head locater bushing toward the fixed locator bushing, thereby coupling the headstack locator to the fixed locator.

When the headstack locator is coupled to the fixed locator in this manner, a positive pressure may be applied to the port, in order to release the headstack locator from the fixed locator. Then, the static pressure in the region, responsive to the positive pressure and ambient pressure outside the assembly, biases the headstack locator bushing away from the fixed locator bushing, thereby decoupling the headstack locator from the fixed locator.

In a preferred form of the invention, the seal is a u-cup wiper seal disposed in a groove in a peripheral surface of the fixed locater bushing. In alternative embodiments, the seal is a U-cup wiper seal disposed in a groove in a peripheral surface of the headstock locator bushing.

In one form of the invention, the channel extends from the port and through the fixed locator bushing, to the region adjacent to the upper surface of the fixed locator bushing. In that form, the material forming a distal tip of the locating pin may be resilient relative to a material forming the pin aperture, thereby effecting an embodiment with minimal wear on the pin and pin aperture over long usage.

In another form of the invention, the channel extends within the locating pin from a distal tip thereof, along the headstack locator axis, to a lateral port in the pin at a region adjacent to the upper surface of the fixed locator bushing.

Among other aspects and advantages, the new and improved assembly quickly and accurately locates and secures a headstack to a spinstand for testing.

BRIEF DESCRIPTION OF THE DRAWINGS

The foregoing and other objects, features and advantages of the present disclosure will be apparent from the more particular description of exemplary embodiments of the disclosure, as illustrated in the accompanying drawings in which like reference characters refer to the same parts throughout the different views. The drawings are not necessarily to scale, emphasis instead being placed upon illustrating the principles of the disclosure.

FIG. 8 is a side elevation view of a bushing of the headstack locator of FIG. 3;

FIG. 9 is a top plan view of the bushing of the headstack locator of FIG. 3;

FIG. 10 is a side elevation view of a bushing of the fixed locator of FIG. 3;

FIG. 11 is a top plan view of the bushing of the fixed locator of FIG. 3;

DETAILED DESCRIPTION OF EXEMPLARY EMBODIMENTS

Figure 13:
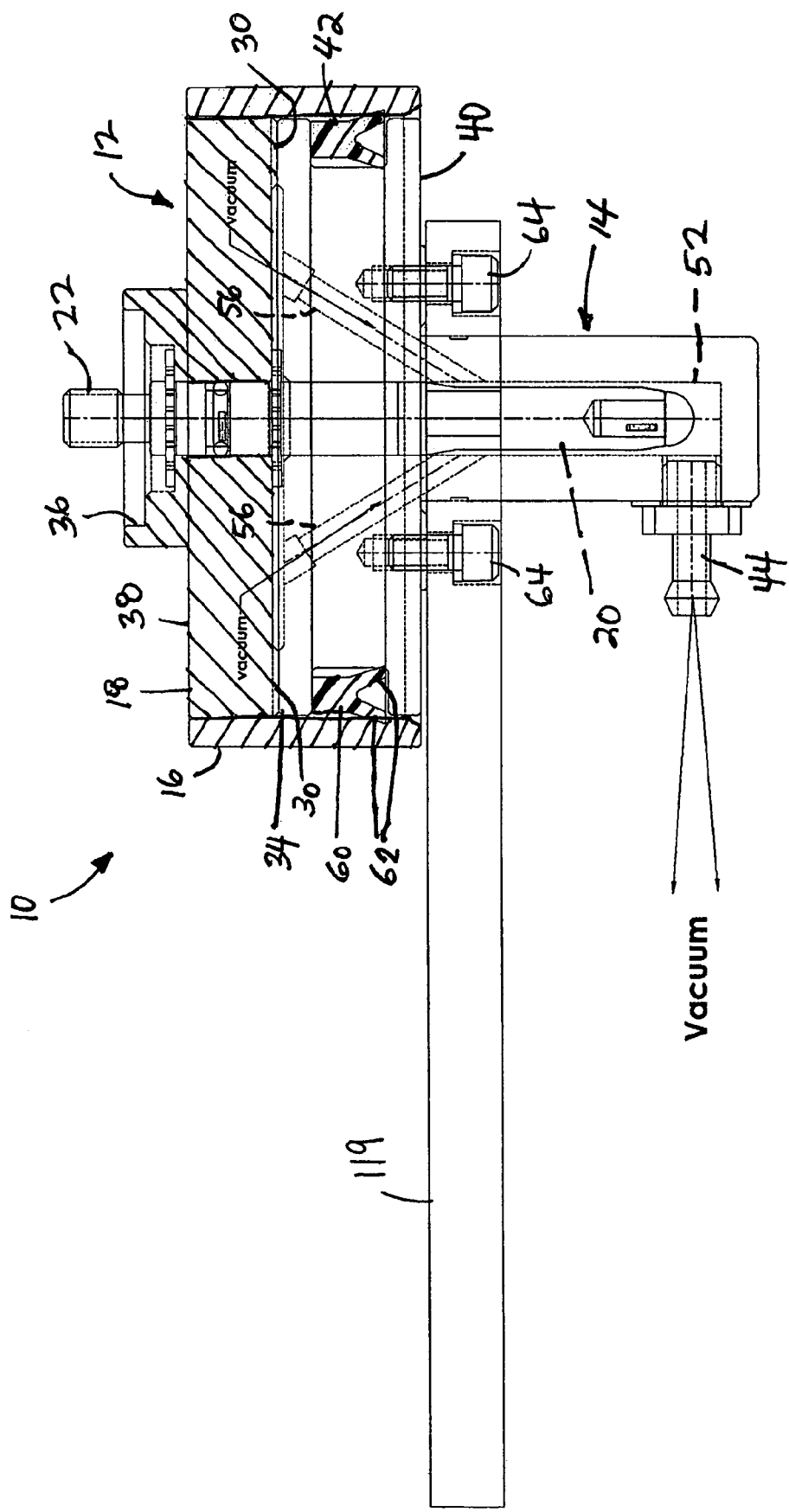
FIG. 13 is a side elevation view, partially in section, of the assembly of FIG. 3 showing the headstack locator received on and being secured to the fixed locator via the application of a vacuum to the fixed locator.
Figure 14:
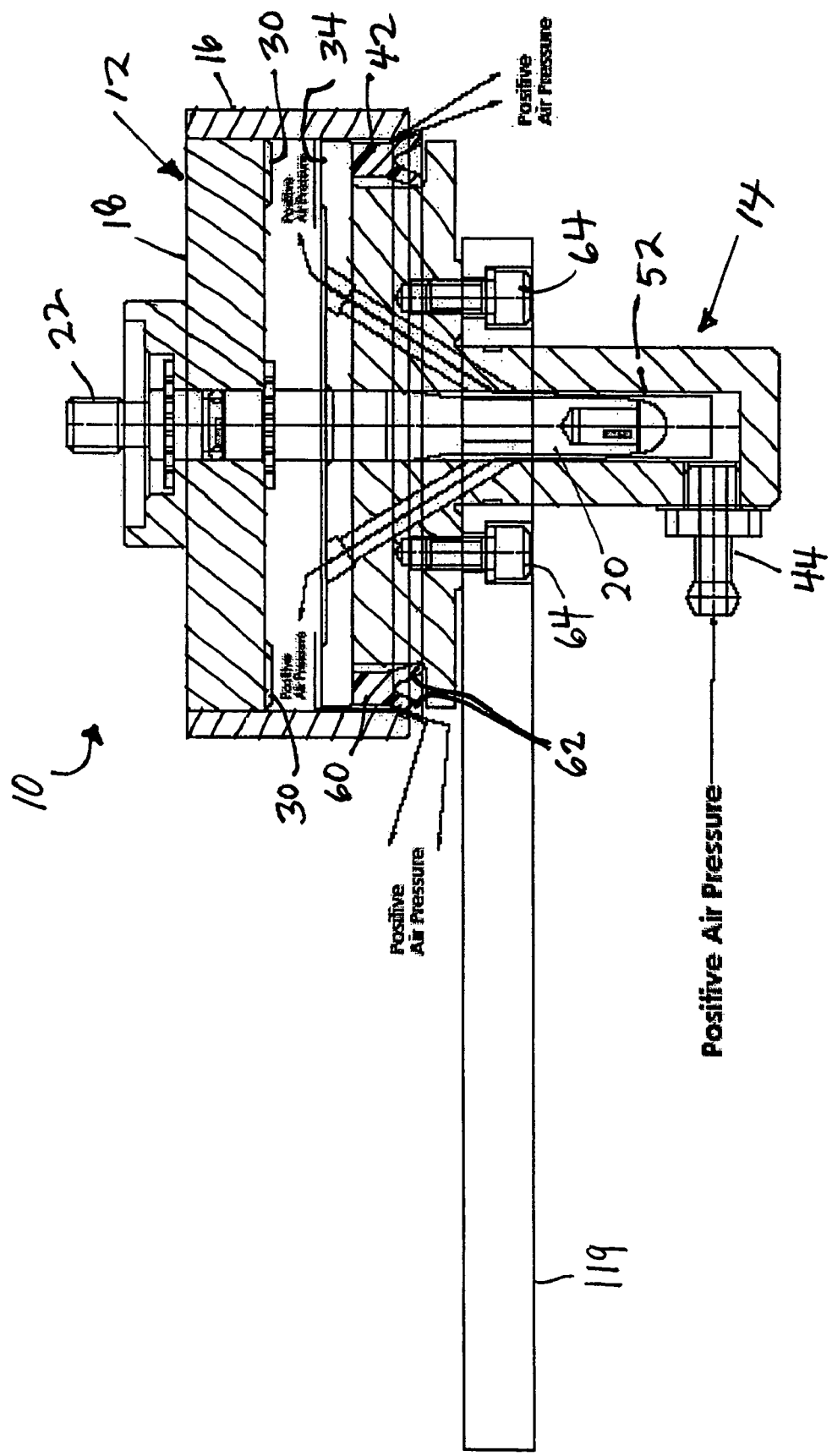
FIG. 14 is a side elevation view, partially in section, of the assembly of FIG. 3 showing the headstack locator received on the fixed locator and being released from the fixed locator via the application of positive pressure to the fixed locator.
Figure 15:
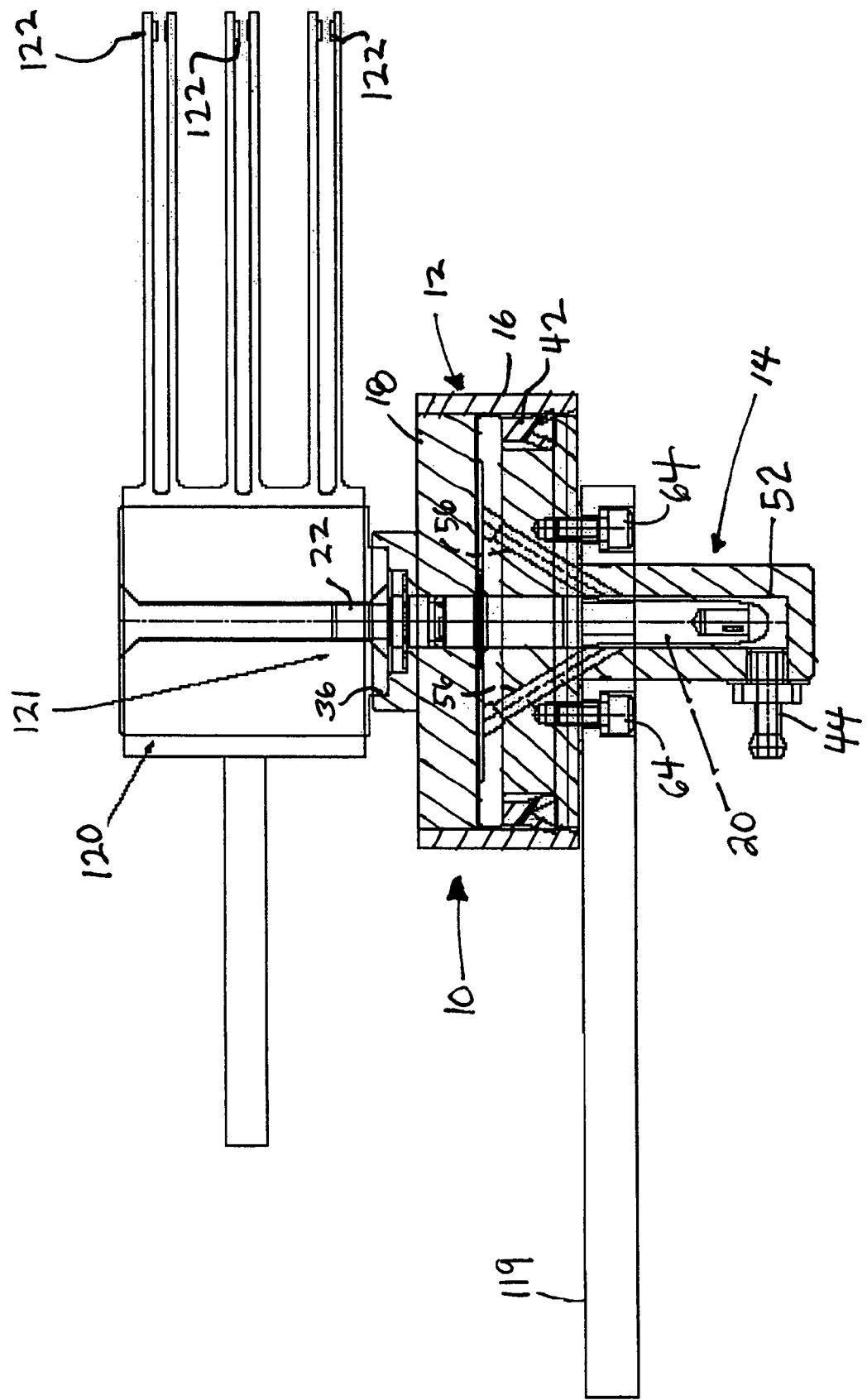
FIG. 15 is a side elevation view, partially in section, of the assembly of FIG. 3 showing the headstack locator received on and being secured to the fixed locator via the application of a vacuum, and wherein an exemplary embodiment of a headstack is shown secured to the headstack locator.

Referring first to FIGS. 3 and 12-15, there is shown an exemplary embodiment of an assembly 10 constructed in accordance with the present disclosure for locating and fixing a headstack on a spinstand. The assembly 10 includes a headstack locator 12 received on a fixed locator 14. The headstack locator 12 connects to a headstack 120 (as shown in FIG. 15 for example), while the fixed locator 14 is permanently secured to a slide 119 of a spinstand. A vacuum is then used to clamp the headstack locator 12 to the fixed locator 14 for testing of the headstack 120. Upon test completion, the headstack locator 12 is released from the fixed locator 14 by applying positive air pressure to the assembly 10.

Among other aspects and advantages, the new and improved assembly 10 quickly and accurately locates and secures a headstack to a spinstand for testing.

Figure 1:
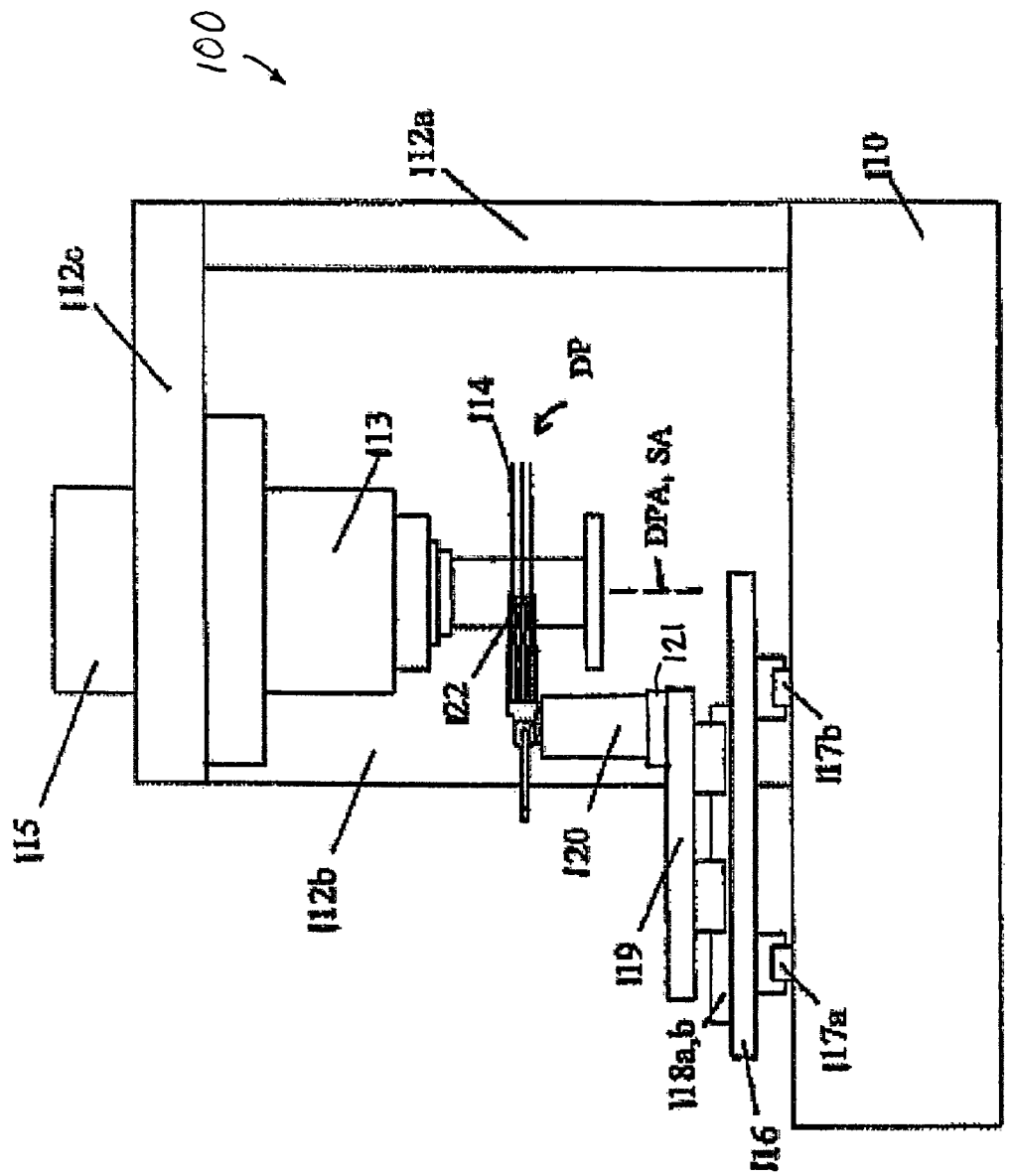
FIG. 1 is a schematic front view of a prior art spinstand.
Figure 2:
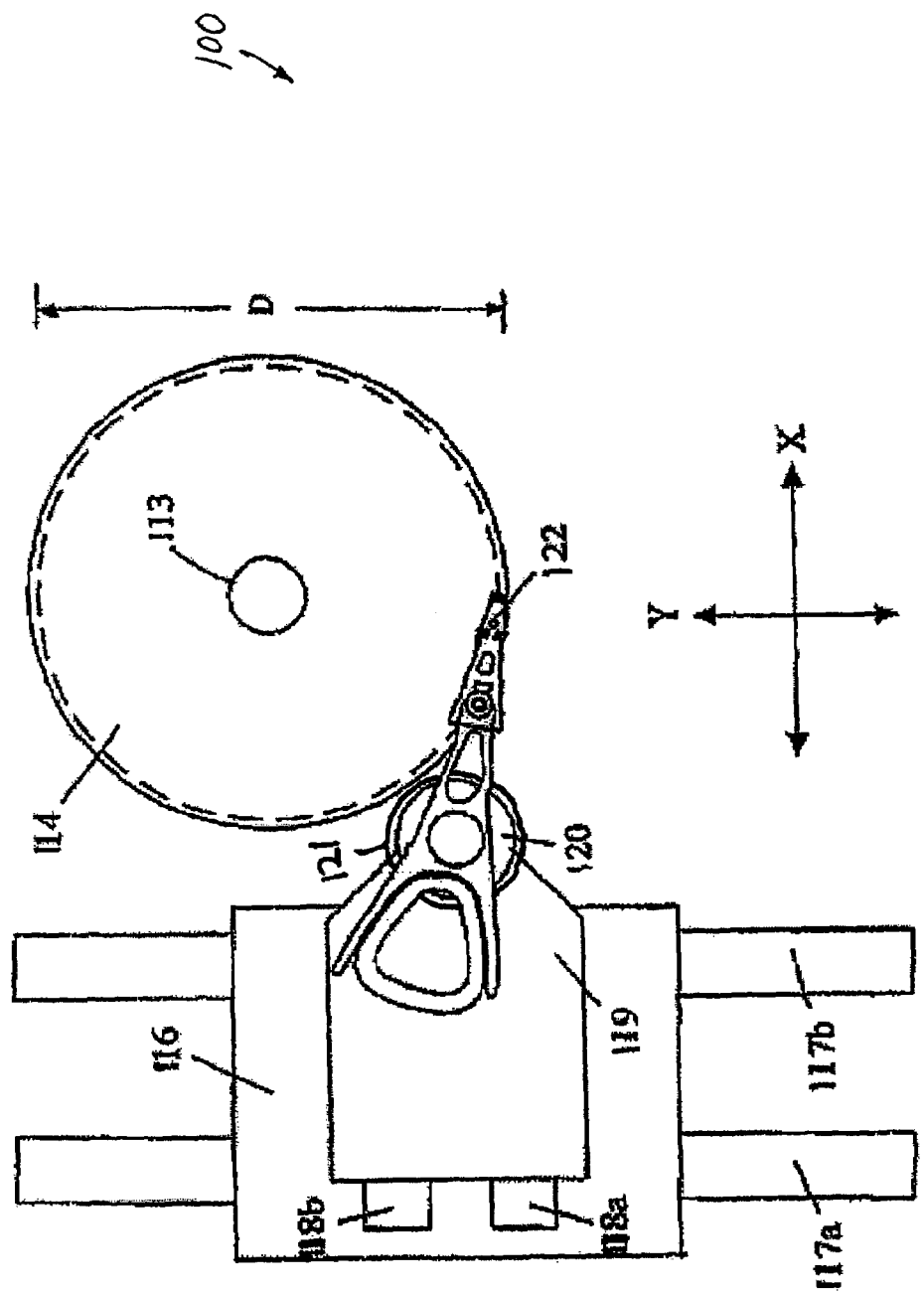
FIG. 2 is a schematic top view of the spinstand in FIG. 1.
Figure 3:
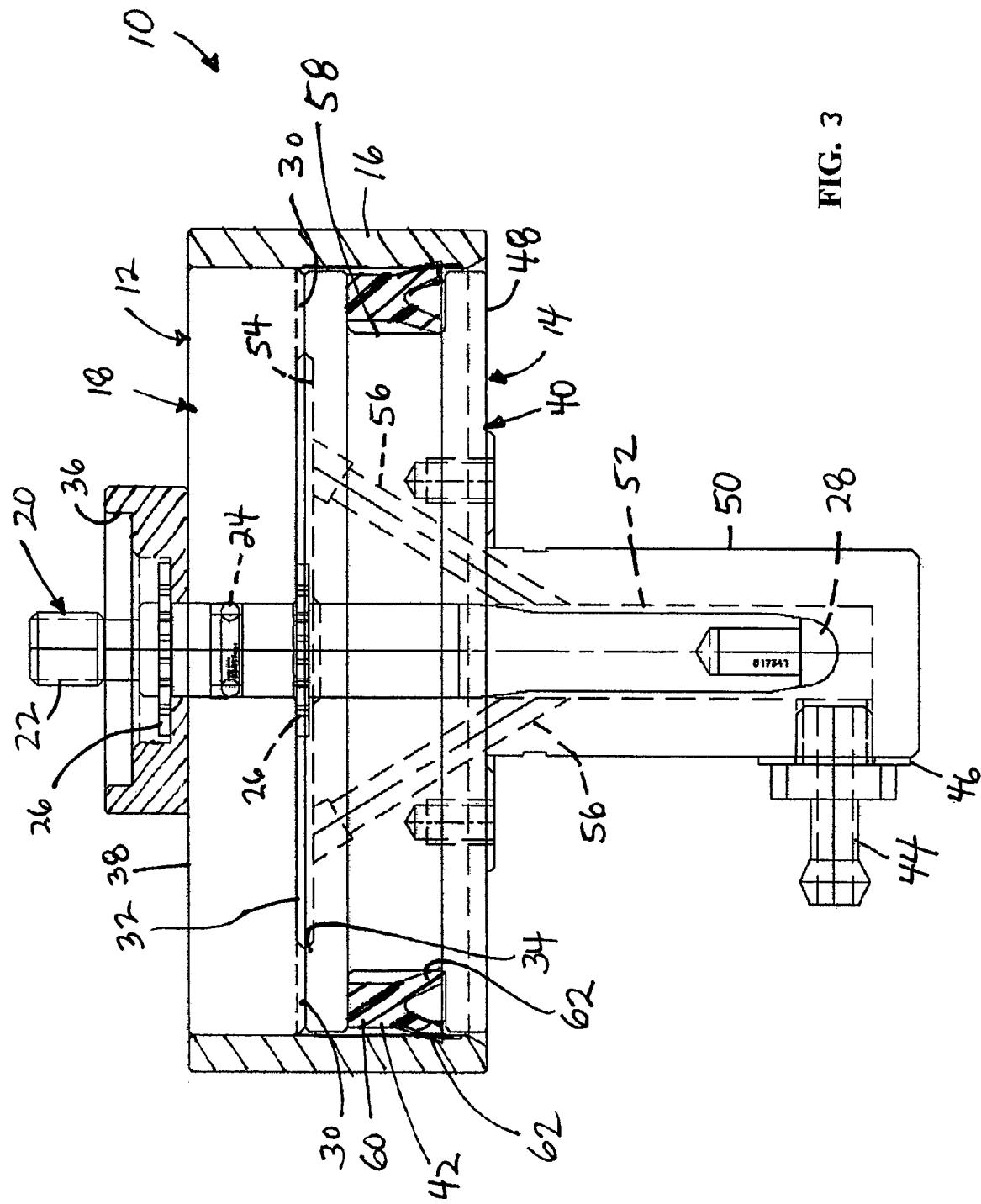
FIG. 3 is a side elevation view, partially in section, of an exemplary embodiment of an assembly constructed in accordance with the present disclosure for locating and fixing a headstack on a spinstand, and including a headstack locator received on a fixed locator.
Figure 4:
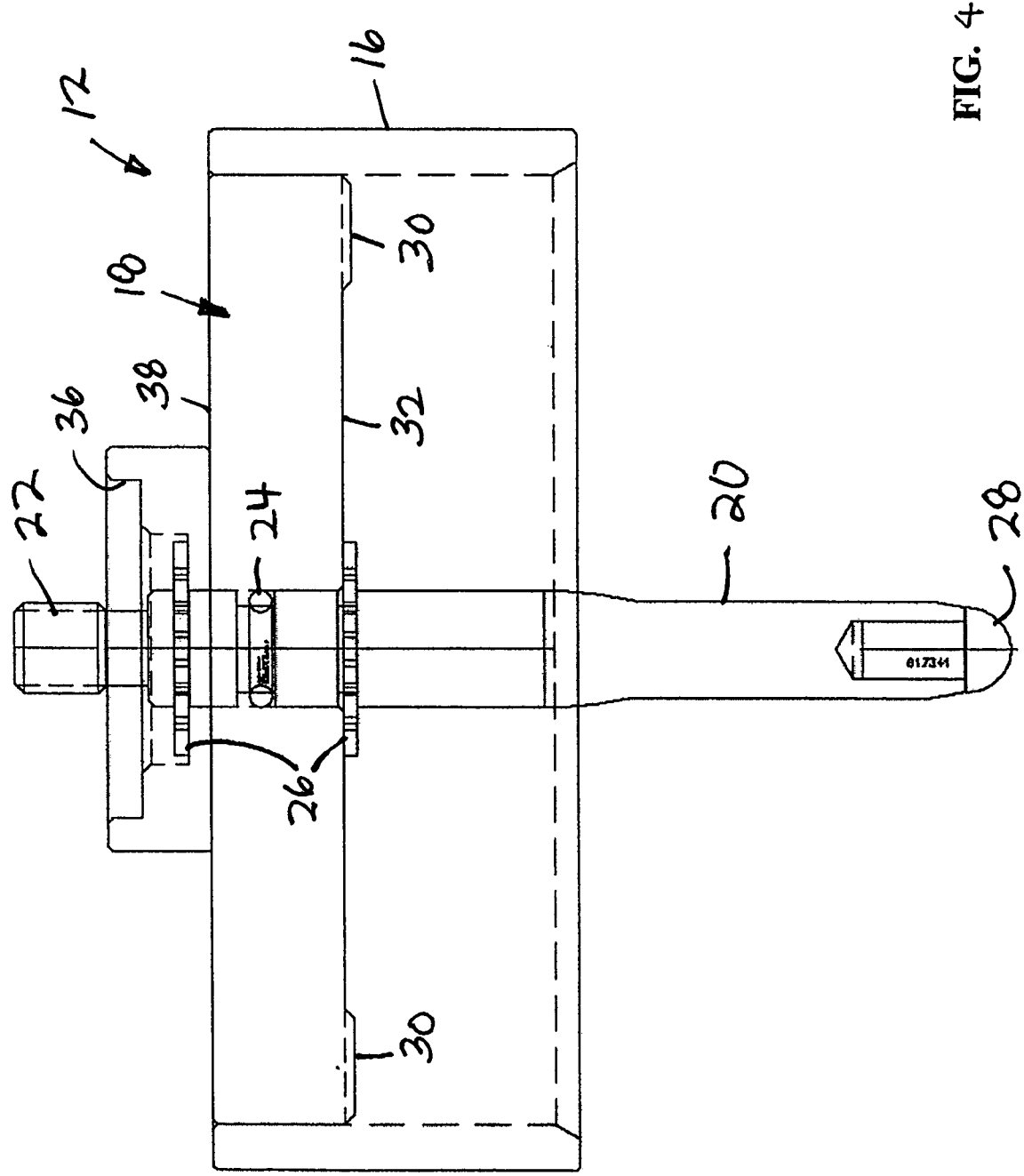
FIG. 4 is a side elevation view of the headstack locator of FIG. 3.
Figure 5:
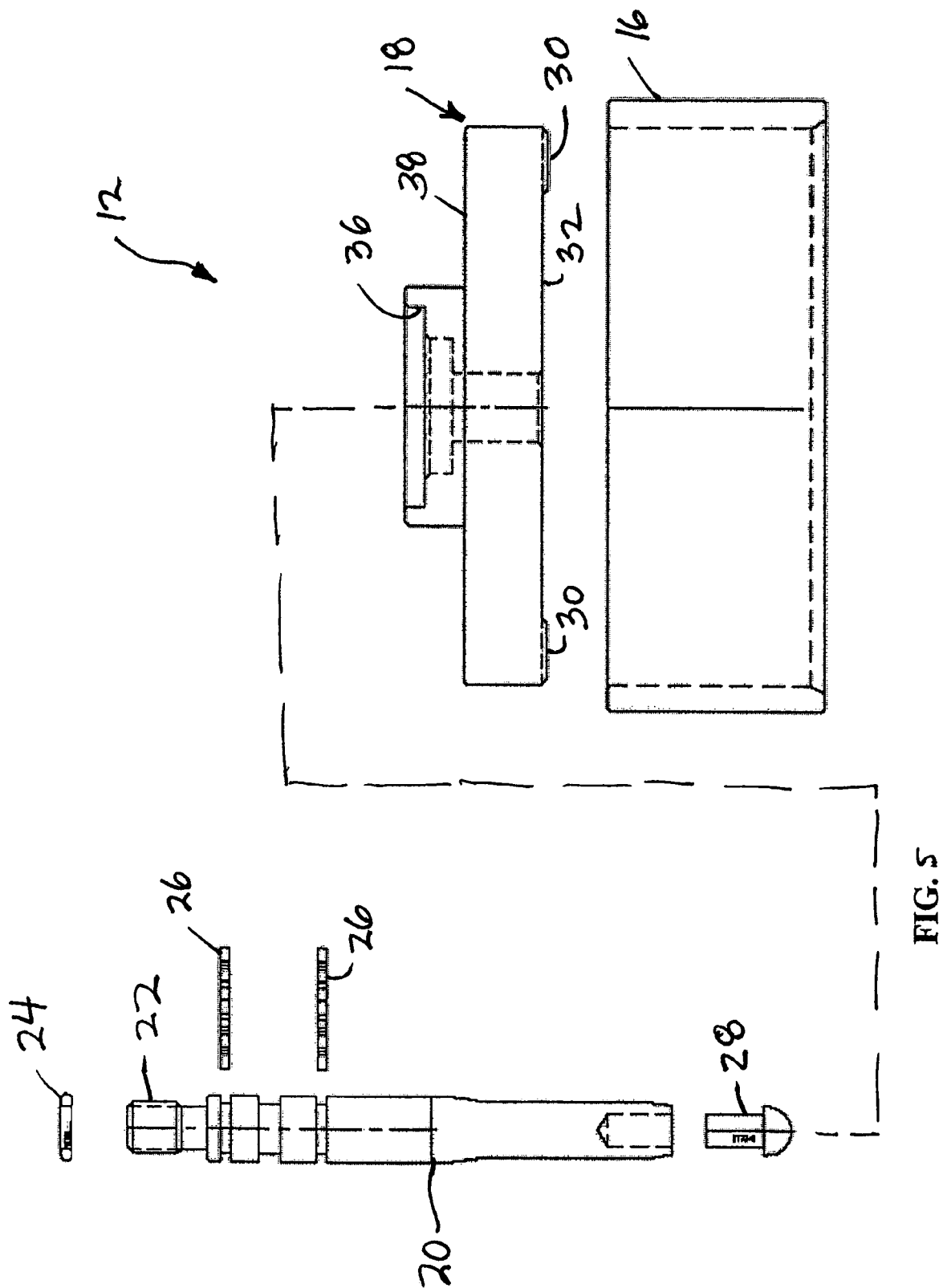
FIG. 5 is an exploded, side elevation view of the headstack locator of FIG. 3.

Referring to FIGS. 3-5, the main components of the headstack locator 12 include a piston ring 16 receiving a bushing 18, which in turn receives a locating pin 20 through a central opening. The locating pin 20 includes means at one end for attaching to a headstack. In the exemplary embodiment shown, the means comprises a threaded portion 22. The threaded portion 22 screws into a pivot bearing 121 of a headstack 120 to secure the headstack to the headstack locator 12, as shown best in FIG. 15. The other end of the pin 20 is used to easily guide and accurately locate, without binding, the headstack locator 12 into the fixed locator 14, as shown in FIGS. 3 and 12-15. The bushing 18 is secured to the piston ring 16 in a suitable manner, such as by being press fit into the ring. The piston ring 16 functions as the sealing/bearing surface between the headstack locator 12 and the fixed locator 14, as shown in FIG. 3.

The headstack locator 12 also includes an O-ring 24 that provides a seal between the locating pin 20 and the bushing 18. The locating pin 20 is held in place with two retaining clips 26, which sandwich the bushing 18 onto the locating pin 20. By using the O-ring 24 and retaining clips 26 for locating the pin to the headstack bushing, the locating pin is allowed to rotate. This prevents over-tightening of the locating pin 20 which can cause damage to the headstack. In an alternative embodiment, the locating pin 20 can be fixed to the bushing 18, by being press-fit or glued to the bushing, without having the ability to rotate in the headstack bushing 18. This alternative embodiment would not use the O-ring or retaining clips.

A plastic button 28 is glued into the tip of the locating pin 20 to protect the mating surfaces of the locating pin 20 and the fixed locator 14. A portion of the locating pin 20 is narrowed near the tip to easily guide the locating pin 20 into the bore of the fixed locator 14 without binding.

The bushing 18 of the headstack locator 12 is also shown in FIGS. 8 and 9. The bushing 18 of the headstack locator 12 includes an annular cup 36 on a top face 38 of the bushing for receiving a headstack 120, as shown in FIG. 15. As shown best in FIG. 9, the bushing 18 also has equally spaced pads 30 on a bottom face 32 thereof. The pads 30 define a height and parallelism of the headstack locator 12 with respect to a top face 54 of a bushing 40 of the fixed locator 14. The pads 30 are received against a top annular surface 34 of the bushing 40 of the fixed locator 14. By using equally spaced pads 30 instead of a solid surface, the headstack locator 12 is less likely to rock due to mating surface scratches or imperfections. In the exemplary embodiment shown, the headstack locator 12 is provided with three of the equally spaced pads 30. In an alternative embodiment, the annular surface is provided on the bushing 18 of the headstack locator 12 while the pads 30 are provided on the fixed locator 14.

Figure 6:
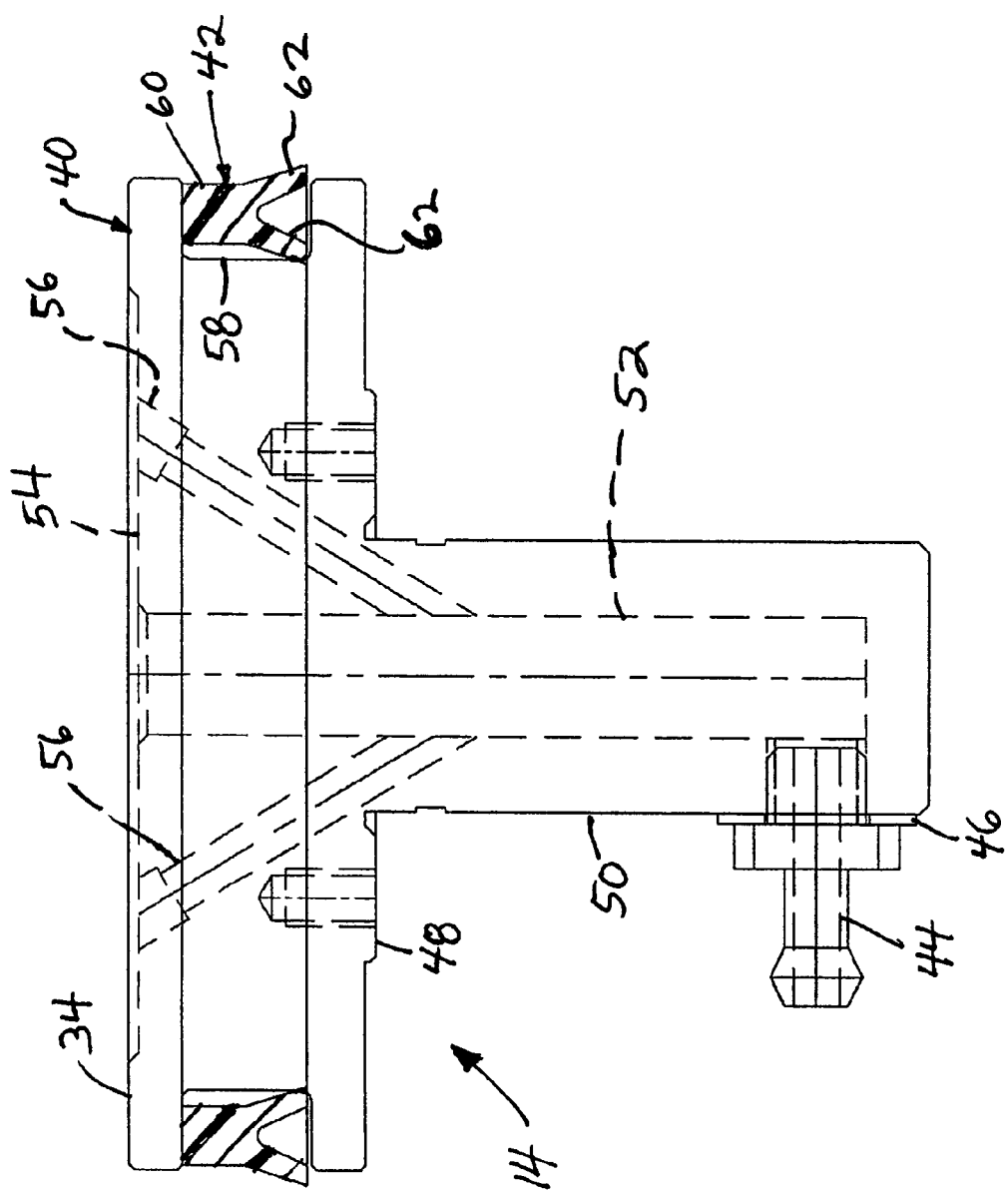
FIG. 6 is a side elevation view, partially in section, of the fixed locator of FIG. 3.
Figure 7:
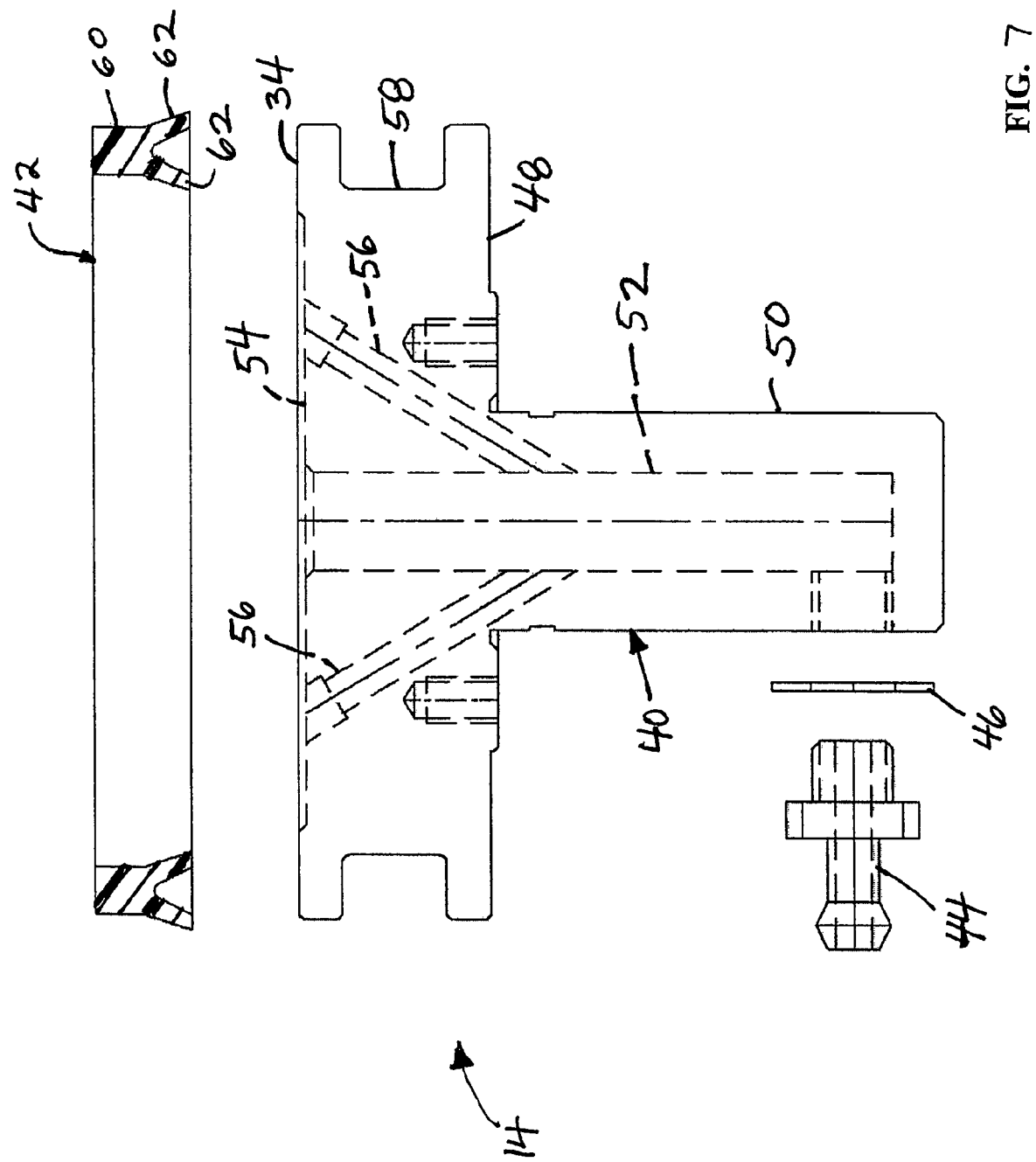
FIG. 7 is an exploded, side elevation view, partially in section, of the fixed locator of FIG. 3.
Figure 12:
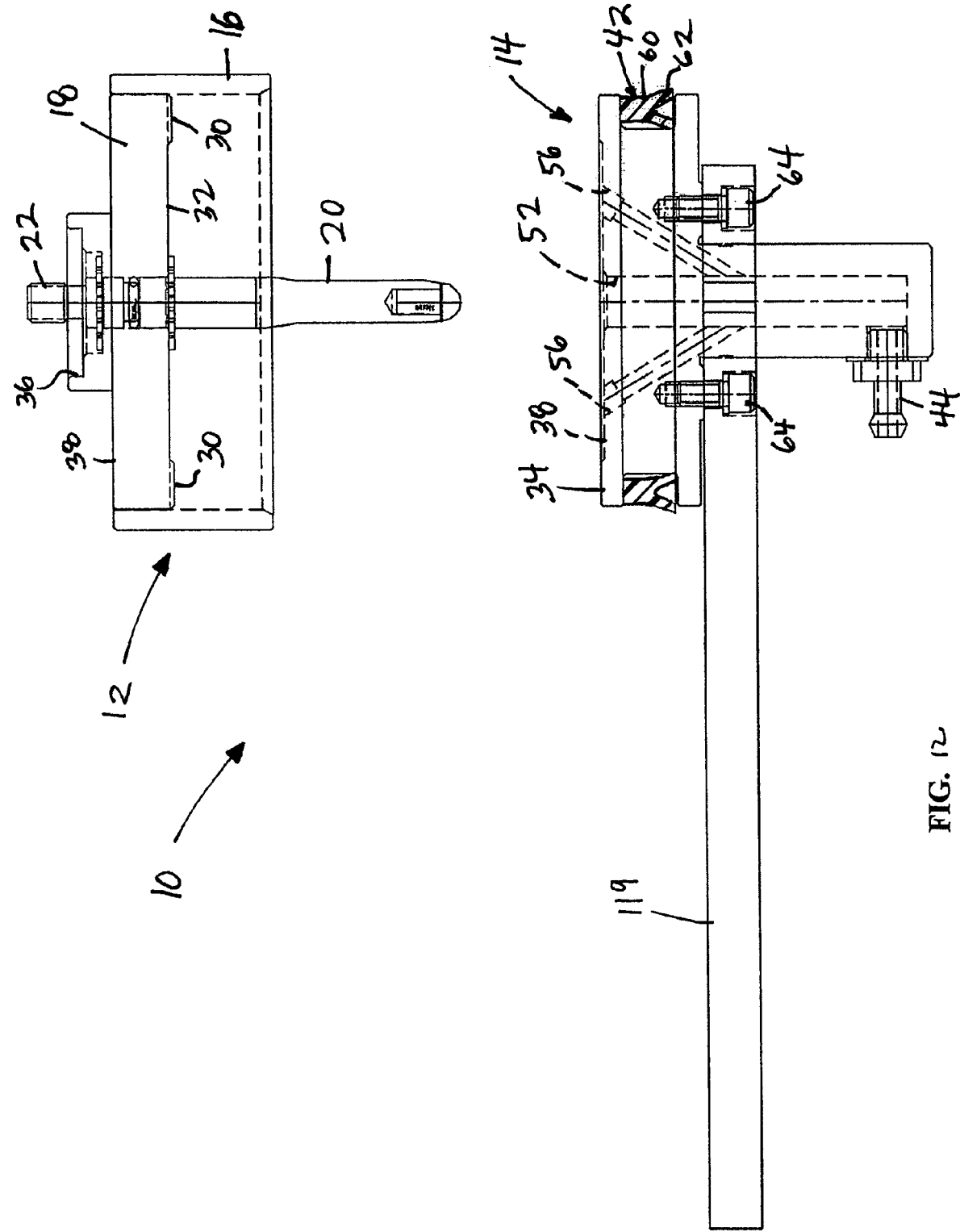
FIG. 12 is a side elevation view of the assembly of FIG. 3 showing the fixed locator secured to a slide of a spinstand and the headstack locator prior to being received on the fixed locator.

Referring to FIGS. 12-15, the fixed locator 14 is secured to a slide 119 of a spinstand, with bolts 64 for example. As shown in FIGS. 3, 6, and 7, the fixed locator 14 includes a bushing 40, a wiper seal 42, a pneumatic barb fitting 44, and a washer seal 46 for the barb fitting. The bushing 40 includes a head 48 and a neck 50. The barb fitting 44 is screwed into the neck 50 of the bushing 40. From the fitting, vacuum is drawn and positive air pressure is applied to a centrally located bore 52 of the bushing 40 of the fixed locator 14. The central bore 52 extends to a top face 54 of the bushing 40 and provides two functions: delivery of negative and positive air pressure to the face 54 of the bushing, and as a receptacle for receiving the locating pin 20 of the headstack locator 12. The head 48 and neck 50 of the bushing 40 also define two ports 56, which are cross-drilled from the top face 54 to the central bore 52. The ports 56 allow vacuum/pressure to be applied more evenly to the entire top face 54.

Figure 17:
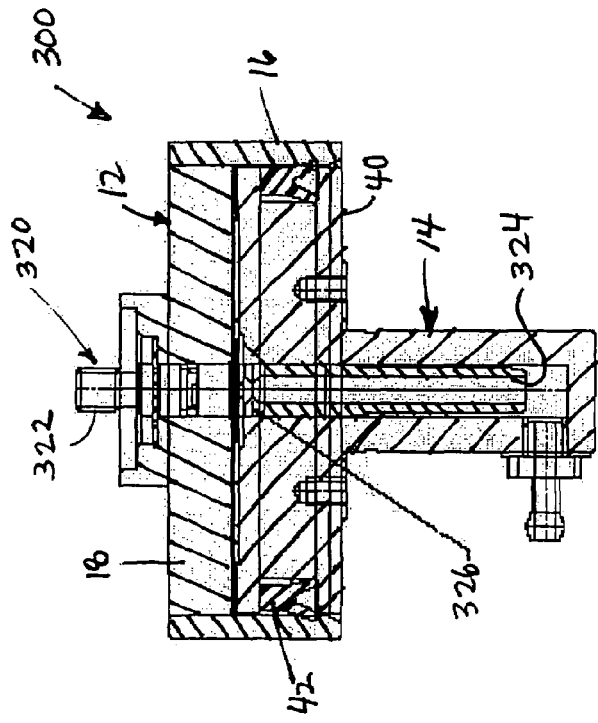
FIG. 17 is an assembled sectional view of the headstack locator of FIG. 16.
Figure 16:
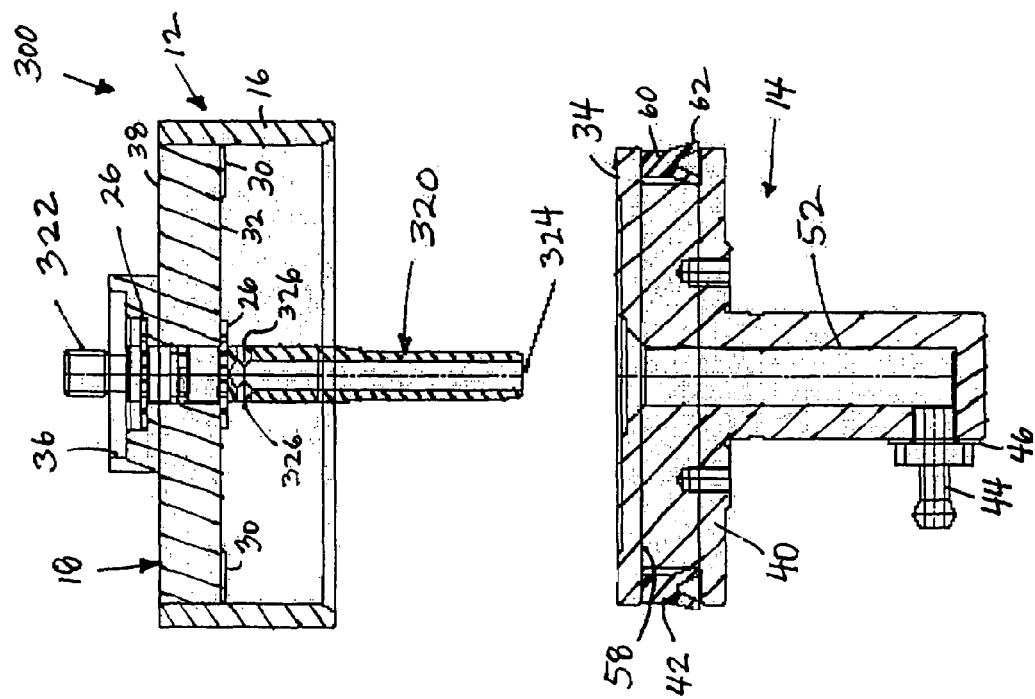
FIG. 16 is an exploded sectional view of another exemplary embodiment of an assembly constructed in accordance with the present disclosure for locating and fixing a headstack on a spinstand, and including a headstack locator received on a fixed locator.

In an alternative embodiment 300 shown in FIGS. 16 and 17, the head 48 and neck 50 of the bushing do not define two ports that are cross-drilled from the top face 54 to the central bore 52. Instead the assembly 300 has a locating pin 320 defining a central port 324 extending upwardly from a tip of the pin (the pin 320 also includes a threaded portion 322 at a top end for attachment to a headstack). The pin 320 also defines two ports 326 cross drilled to the center port 324. The ports 324, 326 deliver positive and negative air pressure from the barb fitting 44 to the space located between the bushings 18, 40.

Figure 19:
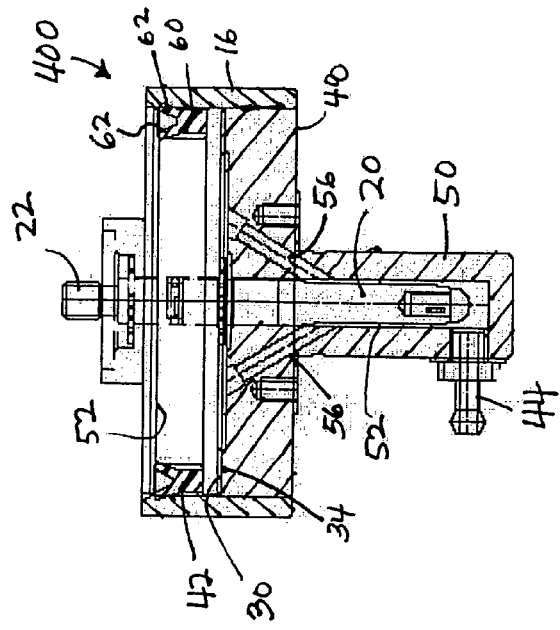
FIG. 19 is an assembled side elevation view, partially in section, of the headstack locator of FIG. 18.
Figure 18:
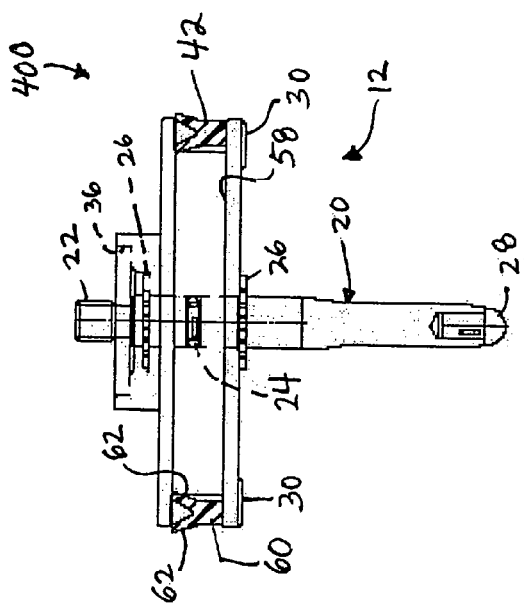
FIG. 18 is an exploded side elevation view, partially in section, of another exemplary embodiment of an assembly constructed in accordance with the present disclosure for locating and fixing a headstack on a spinstand, and including a headstack locator received on a fixed locator.
Figure 18:
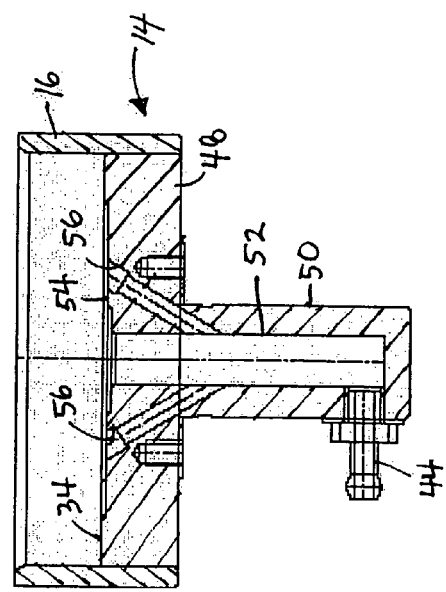

The wiper seal 42 is received in a circumferential groove 58 in a side wall of the head 48 of the bushing 40 of the fixed locator 14. The wiper seal 42 creates a seal between the side wall of the bushing 40 and an inner surface of the piston ring 16 of the headstack locator 12. In the exemplary embodiment shown, the wiper seal comprises a U-cup wiper seal 42. As shown in FIGS. 3, 6, 7, and 12-14, the U-cup wiper seal 42 has a Y-shaped cross-section including a base portion 60 and two arms 62 extending from the base portion. One of the arms 62 is biased against the circumferential groove 58 of the head 48 of the bushing 40 of the fixed locator 14, while the other arm 62 is biased against the piston ring 16 of the headstack locator 12 when the headstack locator 12 is received over the fixed locator 14. The arms 62 are shaped and adapted to provide an air-tight seal between the headstack locator 12 and the fixed locator 14 when a vacuum is applied to the fixed locator 14 in order to secure the headstack locator 12 onto the fixed locator 14. The arms 62 are also shaped and adapted to eventually break the seal between the headstack locator 12 and the fixed locator 14 when positive air pressure is applied through the fixed locator 14 to release the headstack locator 12 from the fixed locator 14. The collapsing of arms 62 of the seal 42 reduces the friction between the seal 42 and the piston ring 16. In doing so, the number or particles generated from the seal 42 due to friction is reduced. In an alternative embodiment 400, as shown in FIGS. 18-19, the seal 42 can be located on the headstack locator 12 and the piston ring 16 can be located on the fixed locator 14.

The headstack locator 12 functions as a quick and accurate interface between a headstack and a spinstand test fixture. The fixed locator 14 functions as an accurate locating device for the headstack locator 12. Negative (vacuum) and positive air pressure is used to lock and release, respectively, the headstack locator 12 to the fixed locator 14. During normal operation, the headstack locator 12 is assembled to a headstack. The headstack locator 12 is then inserted onto the fixed locator 14 by guiding the locating pin 20 into the central bore of the fixed locator 14. The U-cup wiper seal 42 is designed, such that at ambient pressures, the locating piston sleeve 16 easily slides over the U-cup/wiper seal 42. Vacuum to the fixed locator 14 is then turned on and the headstack locator 12 is locked onto the fixed locator 14 by the vacuum. Application of the vacuum to the fixed locator 14 is illustrated in FIG. 13.

When the vacuum is turned off the headstack locator 12 is difficult to remove from the fixed locator 14. To release the headstack locator 12, positive air pressure is applied through the fixed locator 14, such that the headstack locator 12 elevates from the fixed locator 14 and allows an operator to easily remove the headstack locator 12. The airflow is controlled such that the headstack locator 12 safely releases from the fixed locator 14 without fully ejecting. Application of the positive air pressure to the fixed locator 14 is illustrated in FIG. 14.

While this disclosure has been particularly shown and described with references to exemplary embodiments thereof, it will be understood by those skilled in the art that various changes in form and details may be made therein without departing from the spirit and scope of the disclosure.

What is claimed is:

1. A headstack mounting assembly for releasably coupling a headstack to a slide of a spinstand, comprising:
    a fixed locator comprising a first planar surface, and adapted to be affixed to said slide;
    a headstack locator comprising a second planar surface; and
    three pads, each of said pads extending from one of said first planar surface and said second planar surface;
    wherein the headstack locator is adapted to receive a headstack, and is adapted to be selectively coupled to said fixed locator in response to an applied vacuum between said first planar surface and said second planar surface, whereby said first planar surface is opposite said second planar surface, and to be selectively decoupled from said fixed locator in response to an applied positive pressure between said first planar surface and said second planar surface, and
    wherein, during coupling, the first and second planar surfaces are drawn towards each other in response to the applied vacuum, and the three pads maintain separation of said surfaces.

2. An assembly according to claim 1,
    wherein said fixed locator extends along a fixed locator axis, and includes:
        i. a fixed locator bushing disposed about and extending transverse to said fixed locator axis, said fixed locator bushing having an upper surface extending transverse to said fixed locator axis,
        ii. a pin receiving aperture extending from said fixed locator bushing along said fixed locator axis, said pin receiving aperture having a contour with a circular cross-section having a radius which monotonically decreases from said upper surface of said fixed locator bushing,
        iii. at least one airflow channel extending from a region adjacent to said upper surface of said fixed locator bushing to a port, said port being adapted to receive an applied vacuum and an applied positive pressure, and
    wherein said headstack locator extends along a headstack locator axis and includes:
        i. a headstack locator bushing having an upper surface and a lower surface and is disposed about and extending transverse to said headstack locator axis, said headstack locating bushing having a lower surface extending transverse to said headstack locating axis, and including on said upper surface, a coupling assembly for receiving a headstack having a headstack axis, whereby said headstack axis is coaxial with said headstack locator axis,
        ii. a locating pin extending from said lower surface of said headstack locator bushing along said headstack locator axis, said locating pin having an outer contour having a cross-section with a circular cross-section having a radius which decreases monotonically from said lower surface, said contour of said locating pin being substantially complimentary to said contour of said pin receiving aperture, and
    further including a sleeve extending along a sleeve axis, said sleeve extending from a peripheral surface of one of said fixed locator bushing and said headstack locator bushing, whereby said sleeve axis is coaxial with a corresponding one of said fixed locator axis and said headstack locator axis, and wherein the other of said fixed locator bushing and said headstack locator bushing is positionable within said sleeve with said fixed locator axis, said headstack locator axis and said sleeve axis being coaxial when said pin is disposed within said pin receiving aperture.

3. An assembly according to claim 2 further including a seal disposed on one of a peripheral surface of said fixed locator bushing and a peripheral surface of said headstack locator bushing
    whereby said seal pneumatically isolates a region between said upper surface of said fixed locator bushing and said lower surface of said headstack locator bushing and within said sleeve, when said pin is disposed within said pin receiving aperture and a vacuum is applied to said port, whereby static pressure in said region, responsive to said applied vacuum and ambient pressure outside said assembly, bias said head locater bushing toward said fixed locator bushing, thereby coupling said headstack locator to said fixed locator, and
    whereby said seal pneumatically couples said region to regions outside said headstack mounting assembly when a positive pressure is applied to said port, whereby static pressure in said region, responsive to said positive pressure and ambient pressure outside said assembly, bias said headstack locator bushing away from said fixed locator bushing thereby decoupling said headstack locator from said fixed locator.

4. An assembly according to claim 3 wherein said seal is a u-cup wiper seal disposed in a groove in a peripheral surface of said fixed locater bushing.

5. An assembly according to claim 3 wherein said seal is a U-cup wiper seal disposed in a groove in a peripheral surface of said headstock locator bushing.

6. An assembly according to claim 1 wherein said channel extends from said port and through said fixed locator bushing, to said region adjacent to said upper surface of said fixed locator bushing.

7. An assembly according to claim 6 wherein a material forming a distal tip of said locating pin is resilient relative to a material forming said pin aperture.

8. An assembly according to claim 1 wherein said channel extends within said locating pin from a distal tip thereof, along said headstack locator axis, to a lateral port in said pin at a region adjacent to said upper surface of said fixed locator bushing.

9. The headstack mounting assembly of claim 1, wherein the headstack locator comprises the three pads.

10. The headstack mounting assembly of claim 1, wherein the fixed locator comprises the three pads.

11. The headstack mounting assembly of claim 1, wherein the three pads are equally spaced across one of: the first planar surface, the second planar surface.

* * * * *

UNITED STATES PATENT AND TRADEMARK OFFICE
CERTIFICATE OF CORRECTION

PATENT NO. : 7,467,479 B2  
APPLICATION NO. : 11/349508  
DATED : December 23, 2008  
INVENTOR(S) : Nahum Guzik, Charles Brice Arnold and Vladimir M. Chevlioukevitch Page 1 of 1

It is certified that error appears in the above-identified patent and that said Letters Patent is hereby corrected as shown below:

On the Cover page:
Related U.S. Application Data should read as follows:
Provisional Application No. 60/651,561, filed February 10, 2005.

Signed and Sealed this
Fourth Day of October, 2011

David J. Kappos
*Director of the United States Patent and Trademark Office*